Patented Feb. 23, 1943

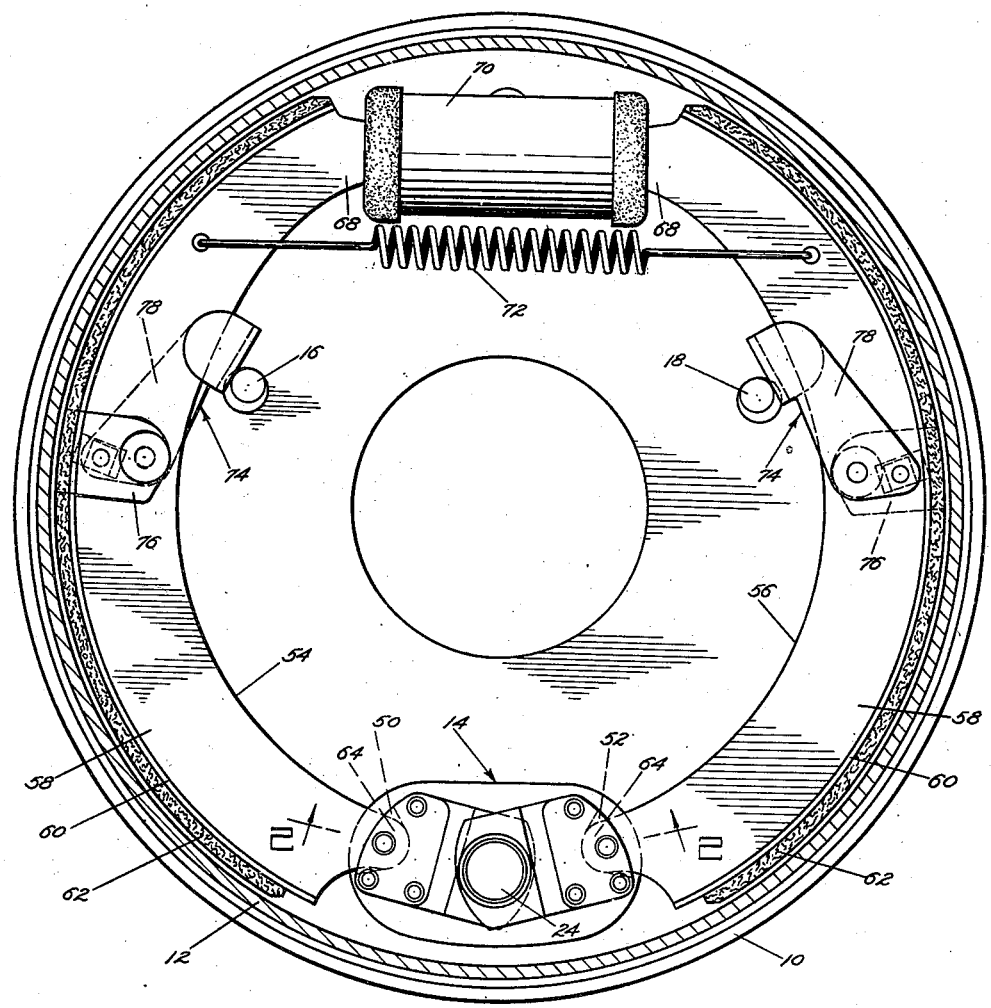

2,311,765

UNITED STATES PATENT OFFICE 2,311,765

BRAKE

Erwin F. Loweke, Detroit, Mich., assignor to Hydraulic Brake Company, Detroit, Mich., a corporation of California Application August 16, 1940, Serial No. 352,977
In Canada October 10, 1939

1 Claim. (Cl. 188—78)

This invention relates to brakes, and more particularly to brakes for motor vehicles.

An object of the invention is to provide a brake structure including a drum, a pair of shoes for cooperation therewith, and means for anchoring the shoes so that torque introduced by frictional engagement of the shoes with the drum is transmitted in directions intercepting radii of the anchor outside of the radius of the anchor center.

Other objects and advantages of the invention will appear from the following description taken in connection with the accompanying drawing forming a part of this specification, and in which, Fig. 1 is a vertical sectional view of a brake illustrating a preferred embodiment of the invention, the anchor and automatic adjusters and the particular arrangement of the latter; and Fig. 2 is a sectional view substantially on line 2—2, Fig. 1.

In the illustrated embodiment of this invention, the brake includes a fixed support or backing plate 10, adapted to be secured to an axle or to an axle housing, and a rotatable drum 12 associated with the backing plate and adapted to be secured to a wheel. The backing plate has arranged thereon an anchor indicated generally at 14 and a pair of adjustable retractile stops 16 and 18.

As shown, the backing plate is swaged to provide a raised portion 20, and suitably secured on the back of this raised portion is a reinforcing plate 22. The raised portion and the reinforcing plate are bored for the reception of an anchor post 24 having on its free end a head 26. The post also has an annular shoulder 28, suitably spaced from the head. This shoulder bears on the perimeter defining the bore in the backing plate, and the outer end of the anchor post is peened as indicated at 30 so as to retain the post against displacement.

A pair of corresponding short links 32 and 34 are pivoted on the anchor post 24 between suitable spacers 36, and a spring washer 38 sleeved on the post between the links and the head of the post with a washer 40 interposed serves to frictionally clamp the links and to yieldingly resist angular movement thereof. The links are off-set as indicated at 42 and 44 so that the free ends thereof may be within a plane common to both links. The ends of the links are notched, and plates 46 and 48 suitably secured to the sides of the links bridge the notches to provide sockets 50 and 52.

A pair of corresponding interchangeable friction elements or shoes 54 and 56 are supported on the backing plate. Each of the shoes includes a web 58 supporting a rim 60 having suitably secured thereto a friction lining 62 for cooperation with the drum. The webs 58 at the articulate ends of the shoes have extensions 64 rounded to fit the sockets 50 and 52 in the free ends of the links 32 and 34, and pins 66 passed transversely through the extensions 64 and the plates 46 and 48 on the sides of the links serve to attach the shoes to the links.

During a braking operation, the extensions 64 on the webs of the shoes serve to transmit torque from the shoes through the links 32 and 34 to the anchor post 24. Because of the position of the extensions 64 on the webs 58 of the shoes, the lines of torque so transmitted are slightly below the anchor post, that is, the line of force acting through the pins 66 causes rotation of the links 32 and 34 about the anchor whereby the torque transmitted to the shoes from the drum follows variable radial lines of greater radius than the anchor center about the axis of the drum. This has a tendency to turn the links 32 and 34 on the anchor post against the resistance of the spring washer 38, and to swing the articulate ends of the shoes into engagement with the drum so as to more effectively apply the shoe, and, as the linings 62 on the shoes wear, the links 32 and 34 serve to automatically adjust the articulate ends of the shoes and to retain them in adjusted position, due to the frictional resistance offered to angular movement of the links by the spring washer 38.

At the force applying ends of the shoes, the webs 58 have extensions 68 connected to a fluid pressure actuated motor 70 suitably mounted on the backing plate between the shoes, and a retractile spring 72 connects the shoes adjacent their force applying ends. The motor is operative to actuate the shoes into engagement with the drum against the resistance of the retractile spring.

Mounted on the webs of the shoes are automatic adjusters, indicated generally at 74. Each of the adjusters includes a drum engaging member 76 mounted upon and movable transversely of the shoe, and a lever 78 fulcrumed on the shoes and connected to the drum engaging member, actuated by movement of the member and for cooperating with the associated stop for supporting the shoe in proper spaced relation to the drum when the brake is at rest.

While this invention has been described in connection with certain specific embodiments, the principle involved is susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is,

A brake comprising a fixed support, a rotatable drum associated therewith, an anchor on the support, a pair of adjustable stops on the support, a pair of links pivoted on the anchor having sockets in their free ends, a spring washer sleeved on the anchor for clamping the links and introducing frictional resistance to angular movement thereof, friction elements pivoted in the sockets in the free ends of the links for cooperation with the drum, automatic adjusters carried by the friction elements and cooperating with the drum and stops, and a motor for actuating the friction elements.

ERWIN F. LOWEKE.